Figure 7:
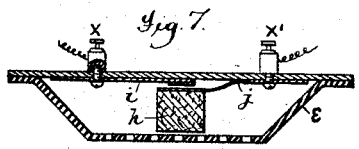

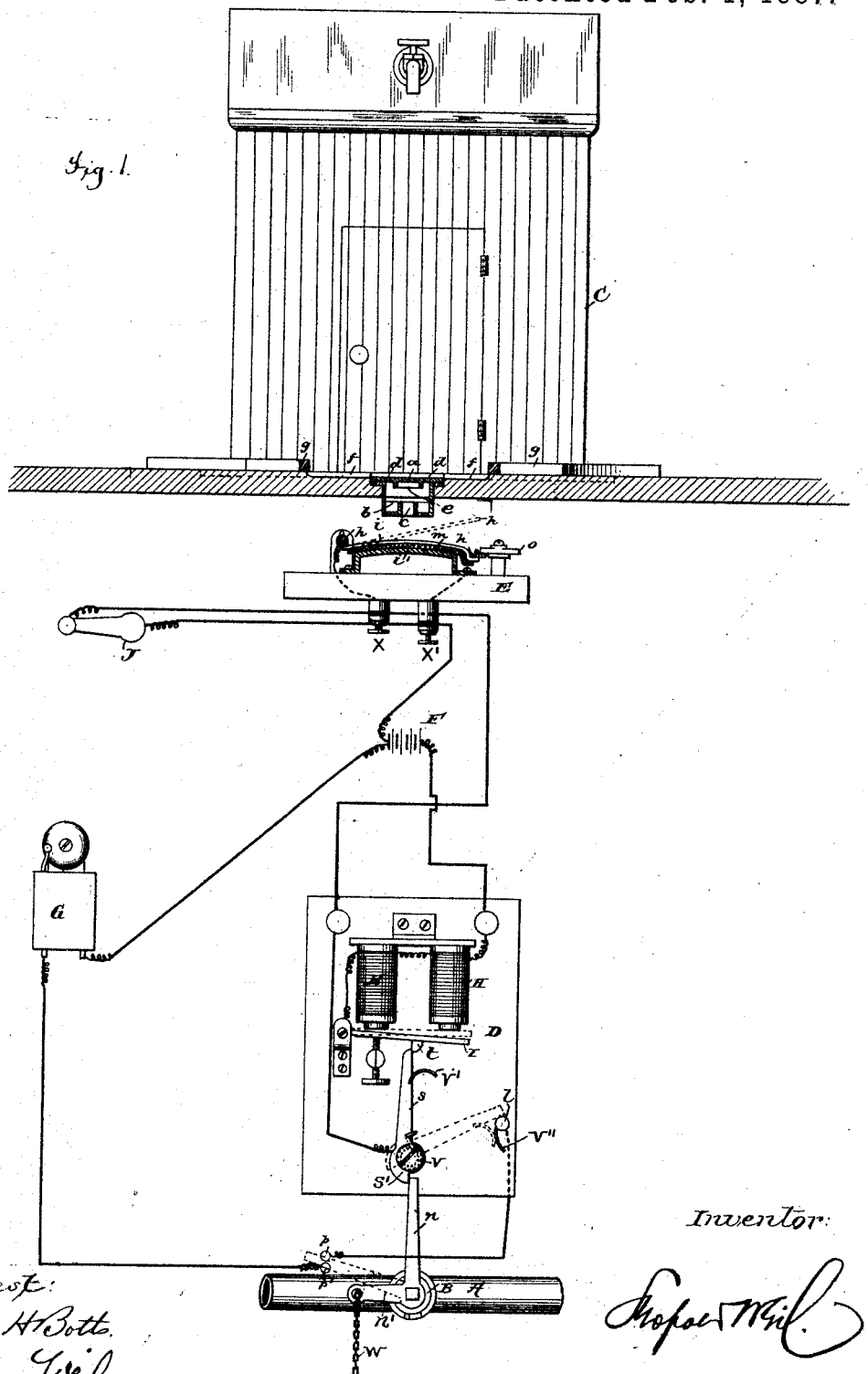

(No Model.) 3 Sheets—Sheet 2.
L. WEIL.
ELECTRICAL METHOD OF DETECTING WATER OVERFLOWS.
No. 357,056. Patented Feb. 1, 1887.
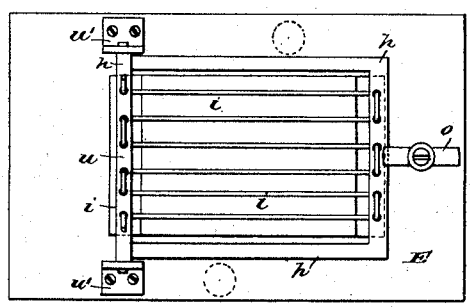
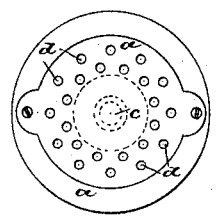
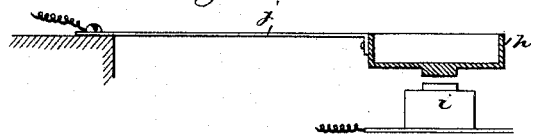
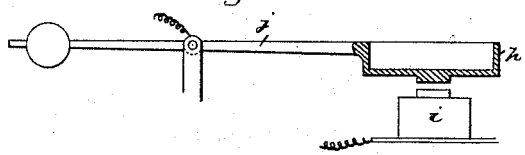
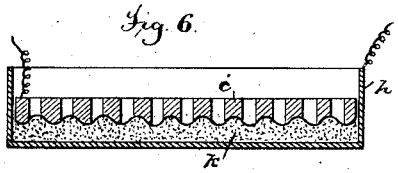

(No Model.) 3 Sheets—Sheet 3.

L. WEIL.
ELECTRICAL METHOD OF DETECTING WATER OVERFLOWS.

No. 357,056. Patented Feb. 1, 1887.

Attest:
Geo. H. Bott.
Isaac Weil.

Inventor:
Leopold Weil.

UNITED STATES PATENT OFFICE.

LEOPOLD WEIL, OF NEW YORK, N. Y.

ELECTRICAL METHOD OF DETECTING WATER-OVERFLOWS.

SPECIFICATION forming part of Letters Patent No. 357,056, dated February 1, 1887.

Application filed October 14, 1886. Serial No. 216,197. (No model.)

*To all whom it may concern:*

Be known that I, LEOPOLD WEIL, a citizen of the United States, residing at New York, in the county of New York and State of New York, have invented certain new and useful Improved Electrical Methods of Detecting Water-Overflows, of which the following is a full, clear, and exact description.

The object of this invention is to provide a simple, inexpensive, and reliable safeguard against damage to merchandise and other property and buildings from overflow or leakage of water.

In Letters Patent No. 336,773, granted to me February 23, 1886, I have described and claimed an automatic water-detecting device, which consists in an electric alarm system so arranged that any leakage of water over a given surface will automatically sound an alarm, and thus give warning of the undesirable presence of water before any material damage can be done. In the electric alarm system described in said patent I employ a device to which I have given the name of "hydrostat," which consists of electric conductors arranged in open circuit, and separated from one another by an insulating material which will absorb water and, when so moistened, will serve as a conductor between the aforementioned conductors to close the circuit, thus operating the system to sound an alarm. I have found in practice that the hydrostat and its connections, as described in said Letters Patent, may be modified and improved to some extent, and I have also found that the hydrostat may be of such construction as to obviate the necessity of using a water-absorbent to separate the conductors and keep the circuit open.

My present invention therefore consists, first, in a method or system of automatically detecting an overflow or leakage of water in a building, which comprises means for directing such overflow or leakage to an electric water-detecting device which is normally inactive, but which becomes operative in the presence of water to sound an alarm and shut off the water-supply at the point of overflow or leakage or to the building.

My invention consists, secondly, in providing the ceilings, floors, or plumbing of a building with an electric water-detecting device which is normally inactive, but which becomes operative in the presence of water to automatically sound an alarm and shut off the water-supply; and my invention consists, finally, in the details of construction and arrangement, as hereinafter described, and pointed out in the claims.

In the following description I shall call the water-detecting device proper a "hydrostat."

In the several figures of the accompanying drawings like parts are designated by similar letters of reference.

In Fig. 1 I have shown the hydrostat arranged below an ordinary wash-stand, and this figure illustrates a diagrammatic view of the electric system, the front portion of the washstand being shown in elevation and the floor of the building and the hydrostat in cross-section. Fig. 2 is a plan view of the form of hydrostat which I prefer to use. Fig. 3 is a plan view of a metal receiver of peculiar construction for directing the water to the hydrostat. Figs. 4, 5, 6, 7, 8, 9, and 10 are details showing modifications in the construction of the hydrostat. Figs. 11 and 12 are modifications showing the application of my invention to a wash-basin or bath-tub.

As shown in Fig. 1, the floor underneath the basin is provided with a series of converging grooves, $f$, and at the meeting-point of these grooves an aperture is made in the floor, into which a metal receiver is inserted. This metal receiver is tubular in form, and is flanged outwardly at its upper edge, and the flange rests upon a suitable depression in the floor surrounding the aperture. The receiver is provided with a cap, $a$, having a downwardly-extending pipe, $e$, forming a cup, and a series of openings, $d$. At its lower edge the receiver is provided with a central opening, $c$, the wall of which extends upwardly a short distance, thus forming a receptacle, $b$, in which water may accumulate, so that none shall flow through the opening $c$ until a sufficient quantity has accumulated, as would be the case in an overflow, and not the case with the leakage of a few drops. The grooves $f$ may be arranged any suitable distance apart, and may also be increased in depth as they approach their meeting-point, and to prevent the water flowing outside of the lines of grooves I employ cleats $g$, which are nailed to the floor at the outer edges of the grooves. The hydrostat may be suspended or supported in any other suitable manner directly beneath the receiver.

As shown in Figs. 1 and 2, the hydrostat consists of electric conductors arranged in open circuit and separated from one another by a material which will absorb water, and thereby close the circuit and render it operative. To this extent the hydrostat embodies the principle of the invention described in Letters Patent No. 336,773. In practice, however, I have found that when the water-absorbent has been wet once it has to be removed and another piece of the material substituted. It is therefore necessary to so arrange the conductors that the removal of the old piece of material between them and the substitution of a new piece can be done conveniently and without waste of time. To accomplish this I have attached the conductor $i$, Fig. 2, which is composed of wire, to a frame, $h$, one end of which is attached to a shaft or rod, $u$, supported and free to turn in bearings $u'$, suitably attached to a base-piece, E, Fig. 1, upon which the hydrostat rests. The frame $h$ is provided with a series of openings in each end, arranged at suitable distances apart, and the wire forming the conductor $i$ is inserted through these openings and passes back and forth from end to end of the frame. The conductor $i'$ may consist of a conducting-plate suitably secured to the base-piece E. The water-absorbent, which is composed of insulating material $m$, is inserted between the conductors $i$ and $i'$, and this is accomplished by raising the frame $h$, carrying the conductor $i$. After the material has been placed in position on top of the conductor $i'$ the frame $h$ is lowered and locked in position by a button or thumb-screw, $o$, so that the conductor $i$ rests upon the insulating material $m$. It is obvious that by this construction of the hydrostat the material $m$ can be conveniently removed and a new piece inserted whenever desirable. This construction of the "hydrostat," so called, I do not herein specifically claim, but reserve the same for a future application.

The electrical devices by means of which, in case of an overflow, the hydrostat is made to shut off the water-supply and sound an alarm are also shown in Fig. 1. They consist of a battery, F, alarm-bell G, and trip apparatus D.

The trip apparatus is arranged as follows: H H is an electro-magnet, whose armature I is normally in the position shown by the full lines. This armature carries a catch, $t$, which, in the normal position of the armature I, engages with a lever, $s$. At $v$ is a spring, which tends to throw the lever $s$ to the right against the stop or binding-post $l$, as shown by the dotted lines. A designates the water-supply pipe, which is provided with a cut-off cock, B, operated by a bell-crank lever, $n\ n'$. Attached to the arm $n'$ is a weighted chain, $w$. The lever $n$ is retained in its normal position, as shown by the full lines, by the catch $s'$ on the lever $s$.

The electrical connections are as follows: The binding-post $X'$ of the hydrostat is connected with the battery F. From F a wire is run to the electro-magnet H H, thence to the armature I, which is in metallic connection with the lever $s$. From $s$ a wire is run to the binding-post X of the hydrostat. A wire is also run from the battery F to the bell G, thence to the stop $l$. At $p\ p'$ there is a break in this circuit, which is normally open, but which is arranged to be closed when the lever $n$ assumes the position shown by the dotted lines. From X and $X'$ is also run a circuit to a key, J, for the purpose of testing the electrical condition of the apparatus.

The operation is substantially as follows, viz: When an overflow or leakage of water occurs, it is directed by the grooves $f$ and receiver $e\ e$ to the hydrostat E, and as soon as the absorbent material $m$, which forms an insulation between the conductors $i\ i'$, becomes wet it is converted into a conductor and closes the circuit of the battery F through $i\ m\ i'$, the electro-magnet H H, armature I, lever $s'$, and back to the battery F. This energizes the electro-magnet H H, causing it to attract its armature I, thereby releasing the lever $s$, and breaking the battery-circuit at $t$. The lever $s$, being pivoted to the spring-shaft V, is thrown by the spring into contact with the stop $l$. The movement of the lever $s$ releases the bell-crank $n\ n'$, and the latter is actuated by the weighted chain $w$ until its arm $n$ strikes against and closes the break in the alarm-bell circuit at $p\ p'$. These movements of the lever $s$ and bell-crank $n\ n'$ have closed the circuit of the alarm-bell G at $l$ and $p\ p'$, thereby diverting the current of the battery F through G $p\ p'$ $l$ V, the hydrostat E, and back to the battery F, causing the bell G to ring and sound an alarm. At the same time the motion of the bell-crank $n\ n'$ has turned the cock B and shut off the water from the main feed-pipe A. The bell G rings continuously until the leak is attended to, and the hydrostat E is returned to its former insulated condition by the insertion of a fresh piece of insulation, $m$. After the leak is stopped the bell-crank lever can again be turned to its former position, turning on the water in the pipe A, the lever $s$ and armature I reset, and the apparatus is again ready to indicate any further leakage or overflow.

As it only requires a very small quantity of water to set this mechanism in motion, it will thus be seen that a leakage or overflow will not only be almost instantly detected, but the water-supply will be shut off before any material damage can be done. It is obvious that by making suitable connections the water-supply can either be shut off only at the point of leakage or overflow, or the main supply-pipe to the building can be closed. This is merely a matter of mechanical detail, and need not be particularly described.

The key J is for the purpose of testing the electrical apparatus from time to time. By closing the key J the same electrical action takes place as if the hydrostat was brought into action, the electro-magnet H H' is energized, the lever n released, the water is shut off, and the alarm sounded, showing that the electrical devices are in perfect working order.

I propose to provide my apparatus with a suitable indicator by which the point of leakage or overflow will be located and ascertained by a glance. This will be necessary when the apparatus is used in hotels or other large buildings. When employed in hotels, the hydrostat may be connected with the ordinary call-bell circuit, and in this way the office will be immediately notified, and the room in which the leakage or overflow has occurred be located. In some instances I also propose to connect the test button or key to the door of a building or other similar object, the moving of which is necessary in closing up for the night, and which, when moved, will operate as a test-button, so that the act of closing a building will also close the circuit and shut off the water-supply. I wish it also clearly understood that, although all the devices shown are arranged to work in open circuit, they can also, by a simple mechanical change, be made to operate on a closed circuit, and I do not wish to limit myself to either form of arrangement.

In the drawings I have shown several modifications in the construction of the hydrostat, which I will now proceed to describe.

In the modification shown in Fig. 4, the conductor h is composed of a basin or pan attached to one end of a spring-piece of metal, j, the other end of which may be suitably attached to the floor-beams, or in any other manner, so as to bring the basin or pan directly beneath the opening in the receiver. As water accumulates in the basin or pan it will be borne down by its own weight until it comes in contact with the conductor i, which is arranged as a fixture below it, but normally out of contact with it. When contact is made between the two conductors the circuit will be closed, and when closed the subsequent operations of shutting off the water and sounding the alarm will be substantially as hereinbefore described.

In the modification shown in Fig. 5 the operation will be substantially the same as in Fig. 4, the difference being that, instead of connecting a pan to a spring-piece, I have connected it to a weighted arm, j, fulcrumed at a point, o, so as to allow the weight of water in the pan to force it downwardly so as to make contact between h and i, and thus close the circuit.

In the modification shown in Fig. 6 the conductor h is shaped to form a basin or pan, which is to be partly coated with a layer of sulphate of copper or other soluble material, k. The conductor i is composed of a heavy piece of metal having a series of perforations and having its underface corrugated. When an overflow occurs, the water will pass through the perforations in the conductor i, and coming in contact with the salt or other soluble material k will dissolve it, thereby permitting the conductor i to sink by its own weight until it comes in contact with the conductor h, thus closing the circuit.

Figure 8:
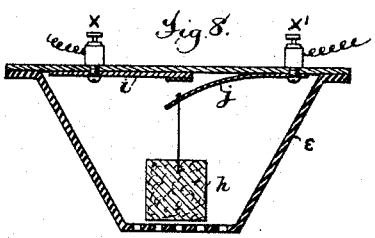
Figure 9:
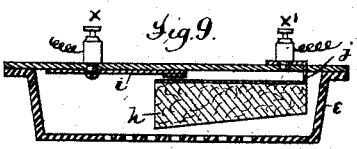
Figure 10:
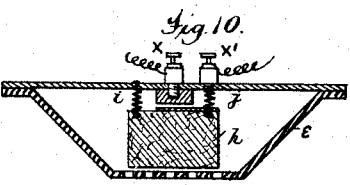
Figure 11:
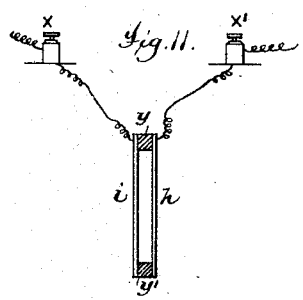
Figure 12:
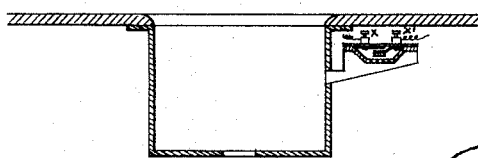

Figs. 7, 8, 9, 10, and 11 show modifications of the hydrostat to be applied more particularly to basins and tubs to indicate and stop any possible overflows from them. In Fig. 7 a float, h, is connected by a conductor, j, to the binding-posts X', and a contact, i, is connected to the binding-post X, all of which is surrounded by a perforated non-conducting protector, E. As the water rises in the basin or tub the float h rises with it until the water reaches a predetermined height, when the float h comes in contact with i, thereby closing the electric circuit and energizing the relay device V and shutting off the water-supply. To operate this device on a closed circuit the whole apparatus needs but to be turned upside down. In this case the float h will be normally in contact with i and the electric circuit closed. When the water rises sufficiently high, the float will be lifted and the connection between h and i broken and the electrical apparatus energized. Figs. 8, 9, and 10 are modifications of Fig. 7. Fig. 11 shows another form, consisting of two parallel plates of metal or other conducting material, h i, separated by insulating-pieces y y. One plate is connected to the binding-post X and the other to X'. As the water rises between the plates h and i it forms a connection between them and so closes the electric circuit.

Fig. 12 shows the hydrostat as applied to a tank or basin. It is arranged in a pocket or receptacle outside of the tank or basin, and operates when the water rises high enough to lift its float into contact. Arranged in this way the hydrostat is not exposed and in the way, but is protected and ready to act whenever an overflow takes place.

It will be noticed that in all these modifications the circuit is closed by contact of the two conductors, which is accomplished as described, although it is obvious that contact may be made in other ways, involving mere mechanical changes in the construction of the hydrostat and not departing from the principle of my invention. It is also obvious that the metal receiver may be connected to the hydrostat and supported by it, and the receiver and hydrostat may be arranged and supported in any suitable manner so as to be operative.

I do not wish to be limited to any specific form of construction of the hydrostat and its connections, as the same results may be obtained in various ways, as indicated by the modifications described.

What I claim as my invention, and desire to secure by Letters Patent, is—

1. A method or system of automatically detecting an overflow or leakage of water in a building, which comprises means for directing such overflow or leakage to an electric water-detecting device which becomes operative in the presence of water to open or close the circuit, and thereby shut off the water-supply and sound an alarm, substantially as described.

2. The ceilings, floors, or plumbing of a building provided with an electric water-detecting device which becomes operative in the presence of water to automatically shut off the water-supply and sound an alarm, substantially as described.

3. A metal receiver for directing the flow of water to the hydrostat, comprising a tubular portion flanged outwardly at its upper end and a cap provided with a series of openings and a short tube or pipe extending upwardly from an opening in its lower end, thereby forming a receptacle at the bottom of the receiver for the accumulation of water, substantially as described, for the purposes set forth.

4. A portable electric trip device consisting of electro-magnets H H, armature I, having catch $t$, lever $s$, having the detent $s'$, and bell-crank $n\,n'$, in combination with the contact-points $l\,p\,p'$, substantially as described, for the purposes set forth.

5. The combination, with the electric trip device of substantially the construction described, of a hydrostat provided with a float carrying a contact-piece and adapted to be actuated by the presence of water so as to operate the circuit, substantially as described, for the purpose set forth.

In testimony whereof I have hereunto set my hand this 12th day of October, A. D. 1886.

LEOPOLD WEIL.

Witnesses:
ISAAC WEIL,
LEOPOLD GUMPERTZ.